(12) United States Patent
Baker et al.

(10) Patent No.: US 6,474,431 B1
(45) Date of Patent: Nov. 5, 2002

(54) ROTATABLE INSTRUMENT PANEL ASSEMBLY

(75) Inventors: Jaimison W. Baker, Raleigh, NC (US); John E. Myslik, Liberty Hill, TX (US); Fred D. Proksch, deceased, late of Peoria, IL (US), by Patricia A. Proksch executrix

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/698,653

(22) Filed: Oct. 27, 2000

Related U.S. Application Data
(60) Provisional application No. 60/215,616, filed on Jun. 30, 2000.

(51) Int. Cl.[7] ............................................. B60K 37/06
(52) U.S. Cl. ................................................. 180/90; 296/70
(58) Field of Search .............................. 180/90; 296/70, 296/72, 73

(56) References Cited

U.S. PATENT DOCUMENTS

| | | | | |
|---|---|---|---|---|
| 2,529,478 A | * | 11/1950 | Bach | 220/263 |
| 3,841,431 A | | 10/1974 | Russey | |
| 3,913,701 A | | 10/1975 | Williams | |
| 4,112,718 A | | 9/1978 | Logsdon et al. | |
| 4,131,173 A | | 12/1978 | Boersma | |
| 4,253,537 A | * | 3/1981 | Intveld | 180/90 |
| 4,359,882 A | * | 11/1982 | Peifer et al. | 70/168 |
| 4,549,625 A | * | 10/1985 | Tindall | 180/90 |
| 5,102,181 A | * | 4/1992 | Pinkney | 296/37.12 |
| 5,165,262 A | * | 11/1992 | Brem et al. | 70/158 |
| 5,184,489 A | | 2/1993 | Squires et al. | |
| 5,726,868 A | | 3/1998 | Koyama et al. | |

FOREIGN PATENT DOCUMENTS

| | | | |
|---|---|---|---|
| JP | 403273947 A | * | 12/1999 |

* cited by examiner

*Primary Examiner*—Brian L. Johnson
*Assistant Examiner*—Deanna Draper
(74) *Attorney, Agent, or Firm*—Diana L. Charlton

(57) ABSTRACT

The present invention includes a method of protecting a plurality of instruments on a control console from damage or vandalism. An instrument panel assembly is mounted in the control console and includes a housing and an inner mechanism rotatably mounted with the housing. The inner mechanism has an instrument panel portion wherein the plurality of instruments are attached and a security panel portion that has a substantially planar and blank surface. The inner mechanism is rotated by an operator (not shown) from an operating position wherein the instrument panel portion is accessible and the plurality of instruments are exposed to a secured position. In the secured position, the security panel portion is accessible and the instrument panel portion is not accessible so that the plurality of instruments are not exposed.

13 Claims, 5 Drawing Sheets

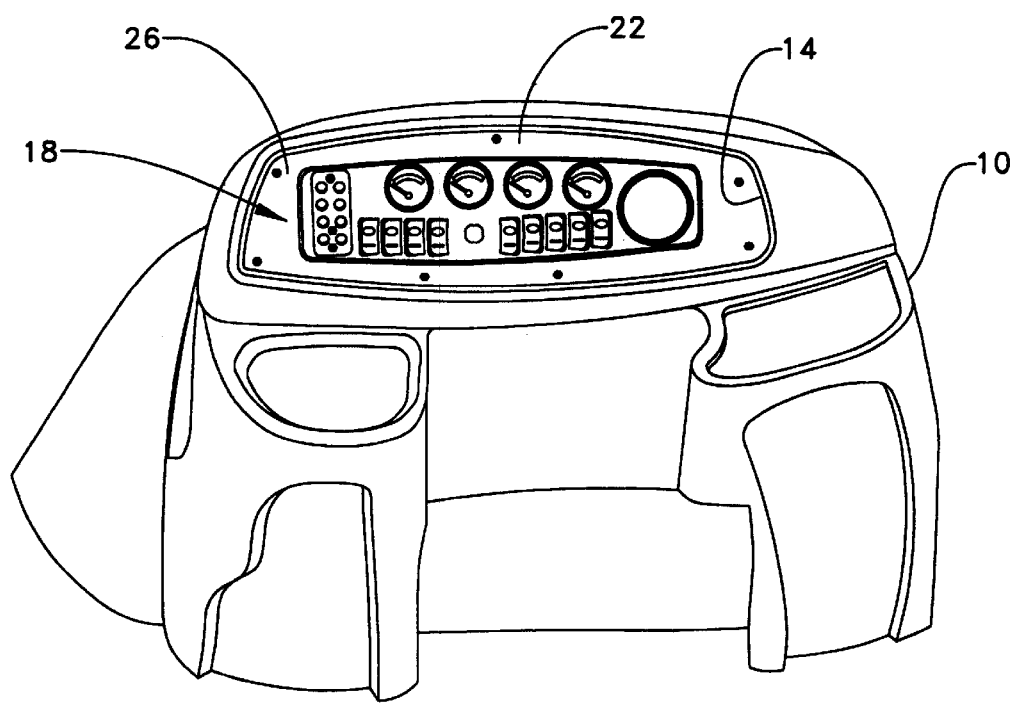

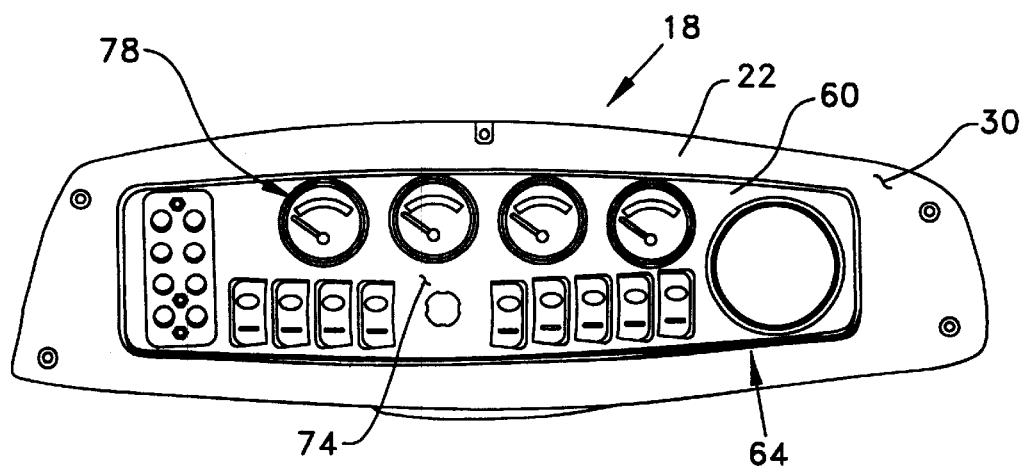
Fig_2_
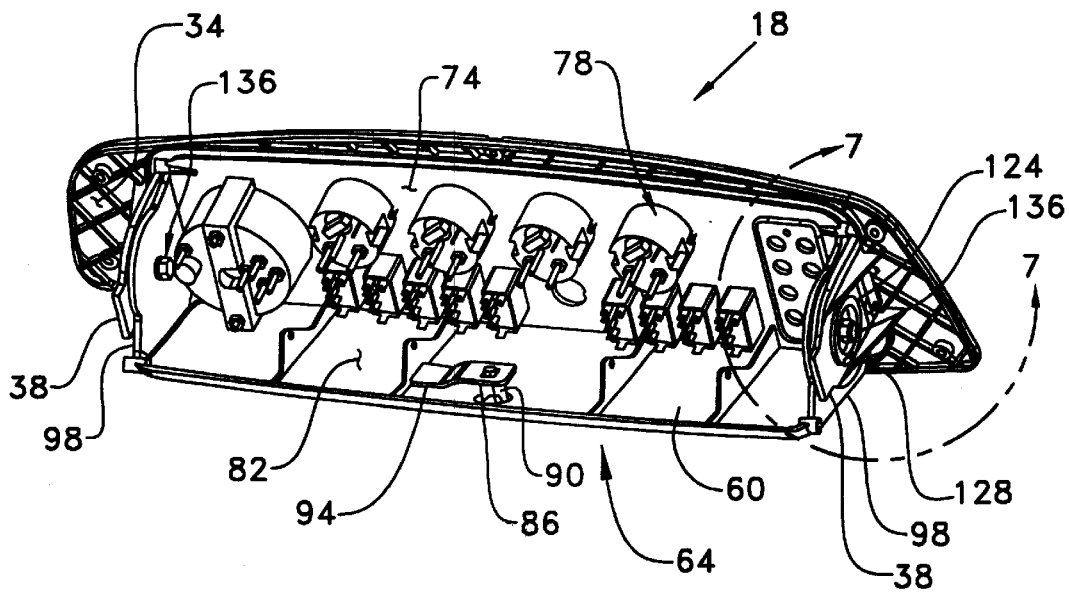
Fig_3_

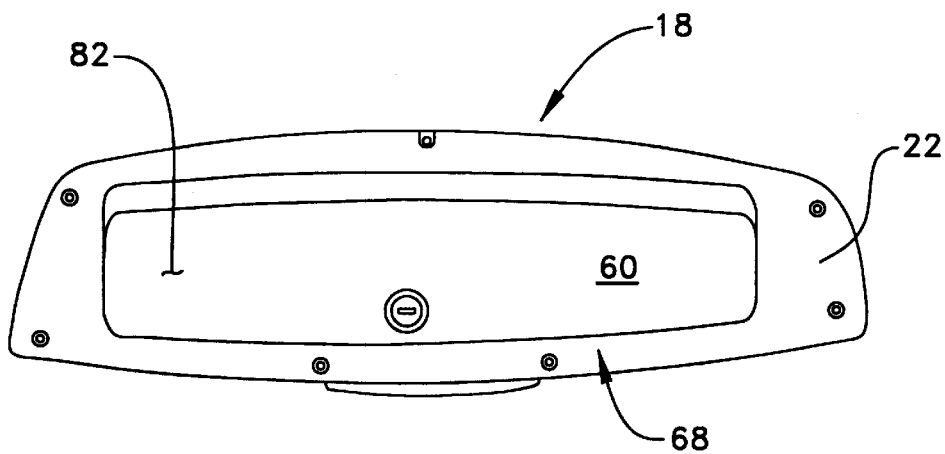
Fig_5_
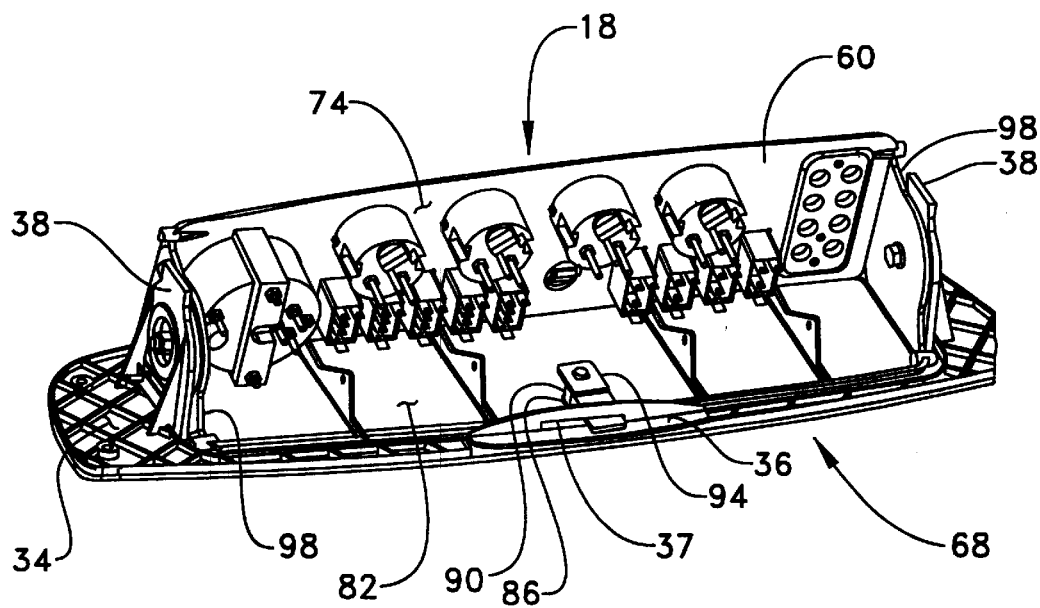
Fig_6_

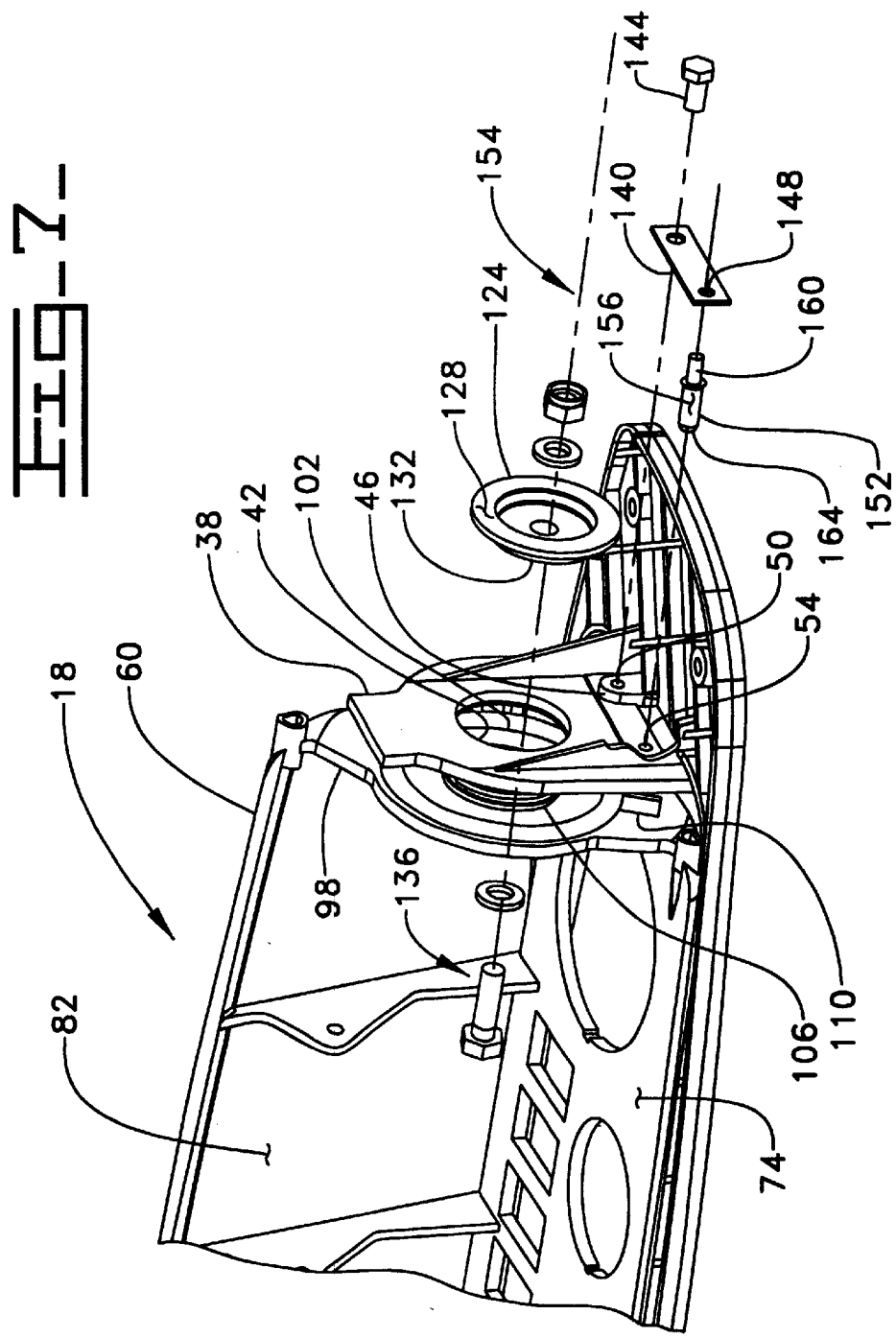

ROTATABLE INSTRUMENT PANEL ASSEMBLY

This application claims the benefit of prior provisional patent application Ser. No. 60/215,616 filed Jun. 30, 2000.

TECHNICAL FIELD

This invention relates generally to a instrument panel assembly for holding a plurality of instruments on a work machine. More particularly, the invention relates to the ability to rotate an inner mechanism of the instrument panel from an operating position where the plurality of instruments are exposed to a secured position where the plurality of instruments are not exposed in order to protect the plurality of instruments from damage.

BACKGROUND ART

It is well-known in the prior art to utilize a hidden panel to secure a vehicle mounted electronic apparatus so as to hide it from view to deter vandalism, theft, and the like. For example, such devices may utilize a lid which is housed within an upper space of the electronic apparatus. The lid may be rotated and pulled downward to cover the face of the electronic apparatus when not in use. Other such devices actually move the electronic apparatus forward or backward by a motor wherein the lid may be open and closed accordingly. Unfortunately, such devices may require complex or large mechanisms to move the electronic apparatus. Further, the lid of such devices project from the electronic apparatus when it is being used, lowering the ornamental appearance of the entire assembly.

In contrast, as seen in U.S. Pat. No. 5,726,868 issued on Mar. 10, 1998 by Kazuya Koyama, et al., a robbery proof mechanism for a electronic apparatus is disclosed that utilizes a cover housed in an upper space of the electronic apparatus. The mechanism is driven by a small drive mechanism without the requirement of moving the electronic apparatus forward or backward. The mechanism includes a frame mounted on the front of the electronic apparatus and a cover capable of insertion into a groove formed in the frame. The frame is rotated to a horizontal position wherein the cover is moved into the groove. The frame together with the cover is then rotated to a vertical position to hide the operation panel. Although a smaller drive system may be used, this mechanism requires a complex series of arms and levers to drive the frame and cover.

Similar devices have been used to protect instrument panels for use in a work machine. For instance, in U.S. Pat. No. 3,913,701 issued on Oct. 21, 1975 by Lary Lynn Williams, an instrument panel cover assembly is disclosed. The assembly includes a cover that is constructed so as to be substantially linearly rearwardly shiftable from a normally stored position to an intermediate position form which it is pivotable vertically downward to a closed position to cover a plurality of instruments mounted within a panel. Also, as seen in U.S. Pat. No. 3,841,431 issued on Oct. 15, 1974 by James W. Russey, an instrument panel guard is disclosed. This guard includes a cover device pivotally connected externally to an instrument console for pivotal movement between a closed protective position covering the instruments and an open position whereby the instruments are readily observable and accessible. These types of protective devices include the use of separate components to act as covers for protecting the instrument therein, increasing assembly and maintenance complexity.

The present invention is directed to overcoming the problems as set forth above.

DISCLOSURE OF THE INVENTION

In one aspect of the present invention, a rotatable instrument panel assembly is disclosed. The rotatable instrument panel comprises a housing with front and rear surfaces and a pair of spaced tab portions that extend from the rear surface. An inner mechanism has first and second end portions rotatably mounted to the tab portions. The inner mechanism has an instrument panel portion and a security panel portion. The inner mechanism is rotatable from an operating position wherein the instrument panel portion is substantially aligned with the front surface of the housing and the security panel portion is located behind the rear surface of the housing to a secured position wherein the security panel portion is substantially aligned with the front surface of the housing and the instrument panel portion is located behind the rear surface of the housing. A plurality of instruments are mounted on the instrument panel portion. The plurality of instruments are viewable at the front surface of the housing when the inner mechanism is in the operating position and are hidden from view at the front surface of the housing when the inner mechanism is in the secured position.

In another aspect of the present invention, a method of protecting a plurality of instruments disposed on an instrument panel assembly for a control console is disclosed. The method comprises the steps of fixedly mounting a housing on the control console. Next, rotatably mounting an inner mechanism with the housing. The inner mechanism has an instrument panel portion and a security panel portion. Then, attaching the plurality of instruments on the instrument panel portion of the inner mechanism. Finally, rotating the inner mechanism from an operating position wherein the instrument panel portion is accessible and the plurality of instruments are exposed on the control console to a secured position wherein the instrument panel portion is not accessible and the plurality of instruments are not exposed on the control console.

In yet another aspect of the present invention, a rotatable instrument panel assembly is disclosed. The rotatable instrument panel assembly comprises a housing with front and rear surfaces and a pair of spaced tab portions that extend from the rear surface. The tab portions each define a central opening therethrough. An inner mechanism has a pair of side flanges that each define a central opening therethrough coaxially aligned with the central openings in the tab portions. The side flanges are rotatably mounted with the tab portions via an attachment device disposed respectively through each of the central openings in the tab portions and the side flanges. The inner mechanism has an instrument panel portion and a security panel portion. The inner mechanism is rotatable from an operating position wherein the instrument panel portion is substantially aligned with the front surface of the housing and the security panel portion is located behind the rear surface of the housing to a secured position wherein the security panel portion is substantially aligned with the front surface of the housing and the instrument panel portion is located behind the rear surface of the housing. A plurality of instruments are mounted on the instrument panel portion. The plurality of instruments are viewable at the front surface of the housing when the inner mechanism is in the operating position and are hidden from view at the front surface of the housing when the inner mechanism is in the secured position.

The present invention is able to move an inner mechanism of an instrument panel assembly with an instrument panel portion and a security panel portion from an operating position wherein the instrument panel portion is accessible and a plurality of instruments attached thereto are exposed on a control console to a secured position wherein the instrument panel portion is not accessible and the plurality of instruments are not exposed on the control console.

BRIEF DESCRIPTION OF THE DRAWINGS

FIG. 1 is a perspective view of a control console mounting the present invention;

FIG. 2 is a front view from an operator's perspective of the present invention shown removed from the control console and located in an operating position;

FIG. 3 is a rear view of the present invention of FIG. 2;

FIG. 5 is a front view from the operator's perspective of the present invention shown removed from the control console and located in the secured position;

FIG. 6 is a rear, rotated view of the present invention of FIG. 5 showing a lock mechanism that maintains the present invention in the secured position; and FIG. 7 is an enlarged view encircled by 7—7 of FIG. 3 including an explosion of the elements for visual clarity.

BEST MODE FOR CARRYING OUT THE INVENTION

Figure 4:
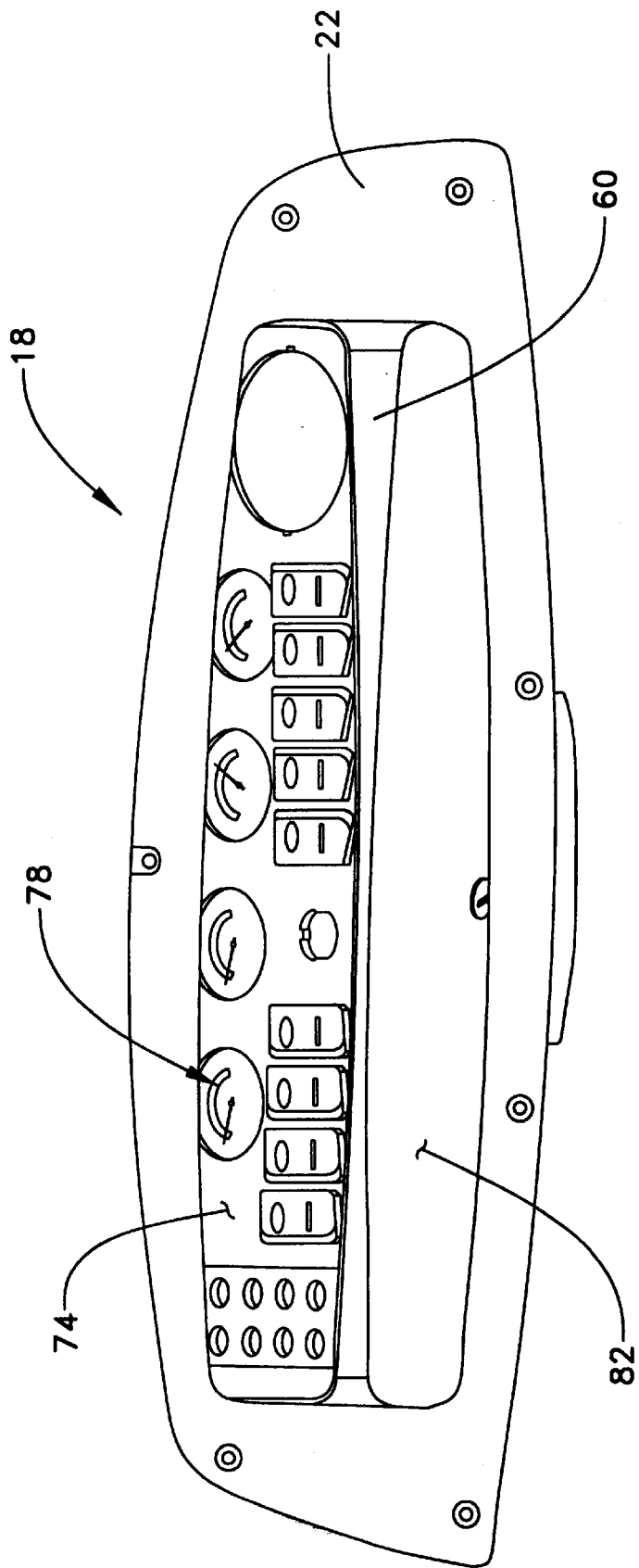
FIG. 4 is a front view from the operator's perspective of the present invention shown removed from the control console and located between the operating position and a secured position.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIG. 1, a control console 10 is mounted in a well known manner within a work machine (not shown) or any other suitable machine (not shown). The control console 10 includes a hollow region 14 therein. An instrument panel assembly 18 includes a housing portion 22 disposed within the hollow region 14 and mounted in any suitable manner to the control console 10, such as through a plurality of bolt assemblies, one of which is shown at 26.

Referring to FIGS. 2–3 & 6–7, the housing portion 22 has front and rear surfaces 30,34. As can be seen most clearly in FIG. 6, a lock tab 36 extends from the rear surface 34 and includes a slotted opening 37 therethrough. As can be seen most clearly in FIGS. 3 & 7, a pair of spaced tab portions 38 extend from the rear surface 34. It should be understood that the elements shown exploded in FIG. 7 on one side of the instrument panel assembly 18 are identical to the elements on the opposite side of the instrument panel assembly 18. Referring specifically to FIG. 7, each of the tab portions 38 include a central opening 42 therethrough. A boss portion 46 is integrally formed with the tab portions 38 and include a threaded opening 50 therein that is spaced from the central opening 42 in the tab portions 38. A spring opening 54 extends through each of the tab portions 38.

Referring now to FIGS. 2–7, an inner mechanism 60 is rotatably mounted with the housing portion 22 and movable between an operating position 64 (seen in FIGS. 2–3) and a secured position 68 (seen in FIGS. 5–6). The inner mechanism 60 has an instrument panel portion 74 for holding a plurality of instruments, one of which is shown at 78. The plurality of instruments 78 may be attached in any suitable manner to the instrument panel portion 74. A security panel portion 82 extends substantially perpendicular from the instrument panel portion 74 and has a substantially planar, blank surface. A lock opening 86 extends through the security panel portion 82, as seen best in FIGS. 3 & 6. A lock mechanism 90 is mounted within the lock opening 86 and includes an elongated tab portion 94 movable between unlocked and locked positions, seen respectively in FIGS. 3 & 6. A pair of spaced side flanges 98 are disposed on opposite ends of the inner mechanism 60 between the instrument panel and security panel portions 74,82. Each of the side flanges 98 include a central opening 102 therethrough, one of which is seen clearly in FIG. 7. As seen in FIG. 7, the central openings 102 in the side flanges 98 are respectively coaxially aligned with the openings 42 in the tab portions 38. A bearing assembly 106 is disposed within each of the central openings 102 and mounted in any suitable manner therein, such as through press-fitting. A pair of spaced slots, one of which is shown at 110, extend through each of the side flanges 98 at opposite ends thereof.

Referring specifically to FIGS. 3 & 7, the rotatable mounting between the housing portion 22 and the inner mechanism 60 is accomplished via a pair of centering disks 124. The centering disks 124 include a mounting surface 128 and a hub portion 132 that extends from the mounting surface 128. The hub portions 132 extend through the central openings 42 in the tab portions 38 for mating with the respective bearing assembly 106 in the side flanges 98. The mounting surface 128 abuts an outer surface of the tab portions 38, seen clearly in FIG. 3. The centering disks 124 are mounted in any suitable manner between the housing portion 22 and the inner mechanism 60, such as through bolt assembly 136. A spring tab 140 is connected in any suitable manner, such as through a bolt 144, to each of the boss portions 46 and includes a spring mounting opening 148 therethrough. A pin 152 is used with each of the spring tabs 140 to define a detent mechanism 154 to substantially control the rotation of the inner mechanism 60. The pins 152 each have first and second sections 156,160. The first section 156 has a larger diameter than the second section 160. The first section 156 includes a tapered end portion 164. The first section 156 extends through the respective spring opening 54 in the tab portions 38 for operative association with the side flanges 98. The second section 160 extends through the respective spring mounting openings 148 in the spring tab 140.

INDUSTRIAL APPLICABILITY

During operation of the work machine (not shown), the inner mechanism 60 is located in the operating position 64. In the operating position 64, the instrument panel portion 74 is accessible to an operator (not shown) so that the plurality of instruments 78 are exposed. Also, the pins 152 extend into one of the pair of slots 110 to assist in retaining the inner mechanism 60 in the operating position 64.

In order to protect the plurality of instruments 78 from damage or vandalism after operation of the work machine (not shown) is complete, the inner mechanism 60 is rotated by the operator (not shown) to the secured position 68 by exerting a slight force on the inner mechanism 60. This force allows the tapered end portions 164 of the pins 152 to act against the side flanges 98 and, in conjunction with the spring tabs 140, defines a spring action that moves the pins 152 out of the slots 110 so that the inner mechanism 60 may be rotated. Once the inner mechanism 60 reaches the secured position 68, the spring action of the detent mechanism 154 defined by the pins 152 and spring tabs 140 forces the pins 152 into the other pair of slots 110 to assist in retaining the inner mechanism 60 in the secured position 68. In the secured position 68, the security panel portion 82 is accessible and the instrument panel portion 74 is not accessible so that the plurality of instruments 78 are not exposed. It should be understood that the rotation of the inner mechanism 60 includes the simultaneous rotation of the plurality of instruments 78.

The bearing assemblies 106 and centering disks 124 are used to protect the inner mechanism 60 and housing 22 from excessive wear during rotation by providing a rotational bearing surface with solid and smooth operational characteristics. It should be understood that the rotational speed of the inner mechanism 60 may also be controlled by any suitable mechanism, such as a braking device (not shown), to provide a smoother transition between the operating position 64 and the secured position 68.

Other aspects, objects and advantages of this invention can be obtained from a study of the drawings, disclosure and the appended claims.

What is claimed is:

1. A rotatable instrument panel assembly, comprising:
   a housing having front and rear surfaces;
   an inner mechanism having first and second end portions rotatably mounted to the housing, the inner mechanism having an instrument panel portion and a security panel portion, the inner mechanism being rotatable from an operating position wherein the instrument panel portion is substantially aligned with the front surface of the housing and the security panel portion is located behind the rear surface of the housing to a secured position wherein the security panel portion is substantially aligned with the front surface of the housing and the instrument panel portion is located behind the rear surface of the housing; and
   a plurality of instruments mounted on the instrument panel portion, the plurality of instruments being viewable at the front surface of the housing when the inner mechanism is in the operating position and being hidden from view at the front surface of the housing when the inner mechanism is in the secured position.

2. The rotatable instrument panel assembly of claim 1, wherein the housing includes a pair of spaced tab portions extending from the rear surface thereof and each of the tab portions define a central opening therethrough, and wherein the inner mechanism includes a side flange located respectively at both the first and second end portions with the side flanges each defining a central opening therethrough coaxially aligned with the central openings in the tab portions, and wherein the rotatable mounting between the inner mechanism and the tab portions is achieved via an attachment device disposed respectively through each of the central openings in the tab portions and the side flanges.

3. The rotatable instrument panel assembly of claim 2, wherein the attachment device includes a centering disk having a mounting surface that abuts with each of the tab portions and a hub portion that extends through the central openings in the side flanges.

4. The rotatable instrument panel assembly of claim 3, wherein a bearing assembly is mounted within each of the central openings of the side flanges for mating with the hub portions of the centering disks.

5. The rotatable instrument panel assembly of claim 1, wherein the instrument panel portion and the security panel portion are substantially perpendicular from one another.

6. The rotatable instrument panel assembly of claim 1, including a pair of detent mechanisms for retaining the inner mechanism in either of the operating or secured positions.

7. The rotatable instrument panel assembly of claim 6, wherein each of the detent mechanisms include a spring tab mounted to each of the tab portions and a pin extending from the spring tab for operative association with the side flanges.

8. The rotatable instrument panel assembly of claim 7, wherein the side flanges each define a slot therethrough and the pins are disposed within the respective slots when the inner mechanism is in either of the operating or secured positions.

9. The rotatable instrument panel assembly of claim 1, including a lock mechanism located on the security panel portion of the inner mechanism, a portion of the lock mechanism being engageble with the housing for retaining the inner mechanism in the secured position.

10. A method of protecting a plurality of instruments disposed on an instrument panel assembly for a control console, comprising the steps of:
    fixedly mounting a housing on the control console;
    rotatably mounting an inner mechanism with the housing, the inner mechanism having a instrument panel portion and a security panel portion angularly disposed from the instrument panel portion;
    attaching the plurality of instruments on the instrument panel portion of the inner mechanism; and
    rotating the inner mechanism from an operating position wherein the instrument panel portion is accessible and the plurality of instruments are exposed on the control console to a secured position wherein the instrument panel portion is not accessible and the plurality of instruments are not exposed on the control console.

11. The method of securing a plurality of instruments of claim 10, wherein the step of rotating the inner mechanism includes the step of:
    forcing a pair of pins from a first position for holding the inner mechanism in either of the operating or secured positions to a second position via a spring action for allowing the rotation of the inner mechanism between the operating and secured positions.

12. The method of securing a plurality of instruments of claim 11, wherein forcing the pins from the first position to the second position includes the step of:
    manufacturing each of the pins with tapered end portions.

13. A rotatable instrument panel assembly, comprising:
    a housing having front and rear surfaces and a pair of spaced tab portions extending from the rear surface, the tab portions each defining a central opening therethrough;
    an inner mechanism having a pair of side flanges each defining a central opening therethrough coaxially aligned with the central openings in the tab portions, the side flanges rotatably mounted with the tab portions via an attachment device disposed respectively through each of the central openings in the tab portions and the side flanges, the inner mechanism having an instrument panel portion and a security panel portion, the inner mechanism being rotatable from an operating position wherein the instrument panel portion is substantially aligned with the front surface of the housing and the security panel portion is located behind the rear surface of the housing to a secured position wherein the security panel portion is substantially aligned with the front surface of the housing and the instrument panel portion is located behind the rear surface of the housing; and a plurality of instruments mounted on the instrument panel portion, the plurality of instruments being viewable at the front surface of the housing when the inner mechanism is in the operating position and being hidden from view at the front surface of the housing when the inner mechanism is in the secured position.

* * * * *